United States Patent
Tajima et al.

(10) Patent No.: US 6,250,068 B1
(45) Date of Patent: Jun. 26, 2001

(54) GAS TURBINE INSTALLATION

(75) Inventors: Katsuhiko Tajima, Hitachi; Katsutoshi Higuma, Takahagi; Akitaka Tateishi, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/356,317

(22) Filed: Jul. 16, 1999

(30) Foreign Application Priority Data

Jul. 22, 1998 (JP) .................................................. 10-206077

(51) Int. Cl.$^7$ ...................................................... F02G 1/00
(52) U.S. Cl. .............................................................. 60/39.33
(58) Field of Search ........................... 60/39.092, 39.093, 60/39.511, 39.05, 39.53; 244/134 R, 53 B

(56) References Cited

U.S. PATENT DOCUMENTS

| | | | |
|---|---|---|---|
| 3,796,854 | * | 3/1974 | Bennett et al. ........................ 219/201 |
| 3,834,126 | * | 9/1974 | Diminno, Jr. ............................. 55/210 |
| 4,509,962 | * | 4/1985 | Breitman et al. ........................ 55/306 |
| 4,561,245 | * | 12/1985 | Ball ....................................... 60/39.02 |
| 4,860,534 | * | 8/1989 | Easley ................................. 60/39.092 |
| 5,979,507 | * | 11/1999 | Kojima et al. ............................ 138/39 |

FOREIGN PATENT DOCUMENTS

| | | |
|---|---|---|
| 61-211647 | 9/1986 | (JP) . |
| 61-295448 | 9/1986 | (JP) . |
| 61-295449 | 12/1986 | (JP) . |
| 62-102044 | 5/1987 | (JP) . |
| 62-108939 | 5/1987 | (JP) . |
| 6-33795 | 2/1994 | (JP) . |
| 7-209469 | 8/1995 | (JP) . |
| 8-297188 | 11/1996 | (JP) . |
| 9-317496 | 12/1997 | (JP) . |
| 9317496 | * 12/1997 | (JP) . |

* cited by examiner

Primary Examiner—Timothy S. Thorpe
Assistant Examiner—W Rodriguez
(74) Attorney, Agent, or Firm—Mattingly, Stanger & Malur

(57) ABSTRACT

According to the present invention, the shape of a passage in an intake-air duct communicated with the suction side of the intake-air filter is regulated so that snow is heaped up in the intake-air duct, and accordingly, the volume of snow reaching the intake-air filter is reduce in order to prevent the intake-air filter from clogging, and to prevent the flow rate of intake-air into a gas turbine from being lowered. In order to attain the above-mentioned purpose, there is provided, according to the present invention, an air-intake method for a gas turbine, in which intake-air 18 taken from a fresh air intake port is fed downward through a second intake-air duct in a substantially vertical direction, and then is fed in a substantially horizontal direction. Thereafter, dust is removed from the intake-air within an intake-air filter chamber, and then, is led into the gas turbine.

7 Claims, 6 Drawing Sheets

GAS TURBINE INSTALLATION

BACKGROUND OF THE INVENTION

1. Field of the Invention

The present invention relates to a gas turbine installation for driving a gas turbine for generating electric power, and in particular, to a gas tubine installation adapted to be built in a district in which snowfall can highly be expected.

2. Related Art

In general, there has been known a snow protection method for an intake-air filter in a ventilating and air-conditioning system, in which a snowbreak hood and a louver are mounted to a fresh air inlet of the ventilating and air-conditioning system. In this method, the snowbreak hood can substantially prevent entrance of snow in a normal snowfall condition, and the louver can prevent advance of snow into an intake-air passage by adjusting the opening degree of the louver in such a case that the amount of snowfall is huge or that the advance of snow cannot be fully prevented due to strong wind, in order to prevent the intake filter from clogging with snow.

For example, Japanese Laid-Open Patent No. H8-297188 discloses a snow protection system for a ventilating and air-conditioning system in a nuclear power plant, in which a heating coil is provided downstream of a louver, and a bird net incorporated with a snow-melting heater is provided between the lower end of a snowbreak hood and the lower end of the louver so as to melt snow which has entered since it cannot be melted by the snow melting heater and blocked by the louver, by means of the heating coil in order to prevent the intake-air filter from clogging.

In addition, Japanese Laid-Open Patent No. S61-211647, Japanese Laid-Open No. S61-295448, Japanese Laid-Open Patent No. S61-295449, Japanese Laid-Open Patent No. S62-102044, Japanese Laid-Open Patent No. S62-108939 and Japanese Laid-Open Patent No. H7-209469 also disclose snow protection technology relating ventilation facilities for power plants.

For example, Japanese Laid-Open Patent No. H6-33795 discloses an intake system for a gas turbine, in which bleed air from a low pressure stage of a compressor in the gas turbine is heated along the outer wall surface of the casing of the compressor, and is thereafter injected into the intake-air filter for the gas turbine in order to prevent freezing of the intake-air filter.

Further, Japanese Laid-Open Patent No. H9-317496 discloses an arrangement in which a heat-exchanger is provided in an intake duct of a gas turbine so as to carry out heat-exchange between intake-air into the gas turbine and heating medium in order to heat the intake air in the gas turbine, or to mix the intake-air in the gas turbine with high temperature fluid in order to heat the intake-air into the gas turbine.

Since a predetermined volume of air has to be continuously taken into a gas turbine during operation thereof, the volume of air cannot be reduced by closing a louver even though it is temporary.

Further, gas turbines have such a tendency as the higher the temperature of intake-air, the higher the drive power of a compressor, resulting in lowering of the efficiency of power generation and the output power thereof. In such a method that a heating coil or a heat-exchanger is provided, or high temperature fluid is mixed so as to raise the temperature of a gas turbine in order to melt snow contained in the intake-air, as disclosed in the above-mentioned Japanese Laid-Open Patent No. H8-297188 or Japanese Laid-Open Patent No. H9-317496, there has been offered a problem of lowering the efficiency of power generation and the output power thereof. Further, the operation of a gas turbine requires a large volume of air in comparison with a ventilating and air-conditioning system in a building (for example, a nuclear power plant station), and accordingly, a relatively large heating volume is required for uniformly raising the temperature of this large volume of intake-air required for the operation of the gas turbine, and for sufficiently melting snow contained in the intake-air until the intake-air reaches the inlet of an intake-air filter. Further, should a heating coil or a heat-exchanger is incorporated in an intake-duct, the pressure loss of a gas turbine becomes extremely high, and accordingly, there has been raised a problem of lowering the efficiency of air-intake.

Further, as disclosed in Japanese Laid-Open Patent No. H6-33795, a method in which high temperature air is directly injected into an intake-air filter in order to remove snow stuck to the filter, has offered a problem in heat-resistance, pressure resistance or the like, and further, exhibits a problem of lowering the compression efficiency since bleed air is extracted from a compressor.

SUMMARY OF THE INVENTION

One object of the present invention is to provide a gas turbine installation in which the shape of a passage in an intake-air duct communicated with the suction side of an intake filter is regulated so as to heap up or stick snow in the intake-air duct, and accordingly, the volume of snow reaching the intake-air filer is reduced in order to prevent the intake filter from clogging, thereby it is possible to prevent the flow rate of intake-air in the gas turbine from being lowered.

To the end, according to the present invention, there is provided a gas turbine installation comprising a gas turbine, a first intake-air duct laid below the gas turbine, for feeding intake-air into the gas turbine, an exhaust duct laid above that intake-air duct, for discharging exhaust gas from the gas turbine, the first intake-air duct having an intake port laid below the exhaust duct and provided therein an intake-air filter, a second intake-air duct communicated with the upstream side of the first intake-air duct and having a second intake-air port formed in the upper part thereof, for introducing fresh air, a first passage extending in a substantially vertical direction from the second intake-air port to the exhaust duct, and a second passage communicated at its one end with the first passage, and extending from the communication part thereof in a substantially horizontal direction, and a third passage communicated at its one end with the second passage, extending from the communication part thereof in a substantially vertical direction, and communicated with the suction side of the intake-air filter provided in the first intake-air duct.

Further, preferably, the second intake-air duct is provided thereto with a snowbreak hood mounted to the second intake-air port and having a fresh-air intake port.

Further, preferably, a stagnating means for stagnating the flow of intake-air into the gas turbine, or a staying means for staying the flow of the intake air into the gas turbine is provided in the vicinity of the communication part between the first flow first passage and the second flow passage.

Further, preferably, a snow or ice melting means for melting snow or ice is provided in the vicinity of the communication part between the first passage and the second passage.

Further, preferably, a heating means for heating the wall surface of the second intake-air duct is provided in the second flow passage.

Further, a fresh air introducing means for introducing fresh air and for leading the same into the intake-air filter is provided in the third flow passage.

Further, preferably, the cross-sectional area of the second passage is set to be greater than that of the first passage through the entire length of the second passage or through the intermediate part thereof.

The present invention will be detailed in the form of preferred embodiments with reference to the accompanying drawings in which:

BRIEF DESCRIPTION OF THE ACCOMPANYING DRAWINGS

DESCRIPTION OF PREFERRED EMBODIMENTS OF THE INVENTION

Intake-air systems for gas turbine installations are sorted into several kinds in view of arrangements of components thereof. Explanation will be hereinbelow made of preferred embodiments of the present invention, exemplifying downward intake-air type gas turbine installations which are most preferable for applying the technical concept of the present invention thereto. In particular, in a conventional gas turbine installation of the downward intake-air type, an intake-air duct and an intake-air filter chamber are provided below a gas turbine and an exhaust duct so as to have such a structure that fresh air is directly taken into the intake-air filter chamber through a fresh air intake-port (intake-air filter part) of the latter. Thus, the fresh air intake port is located near to the ground surface, and is likely to be blocked by snowfall, causing such a problem that a predetermined volume of intake-air cannot be obtained in a district in which it would be expected that the degree of snowfall is extremely high.

Accordingly, in the embodiments of the present invention, the shape of a flow passage in an intake-air duct communicated with the suction side of the intake-air filter is regulated so as to stagnate or stay the flow of intake-air in a gas turbine or to lower the flowing speed thereof. With this arrangement, snow contained in intake-air in the gas turbine is separated from the flow of the intake-air, and is heaped up in or stuck to the intake-air duct, and accordingly, the volume of snow reaching the intake-air filter is reduced so as to prevent the intake-air filter from clogging, and to prevent the flow rate of the intake-air in the gas turbine from being lowered.

Figure 1:
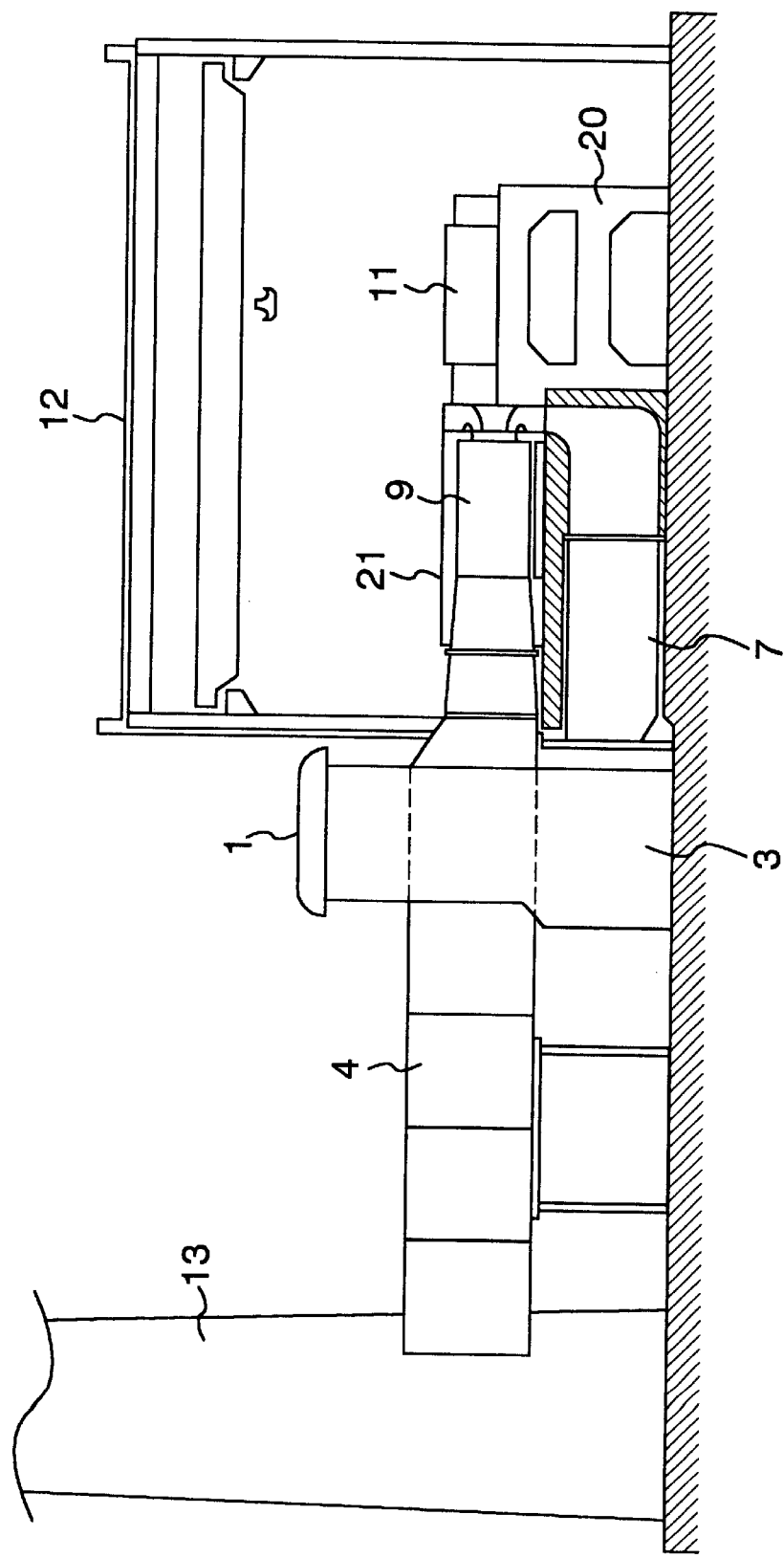
FIG. 1 is a side view illustrating a gas turbine installation in a first embodiment of the present invention.
Figure 2:
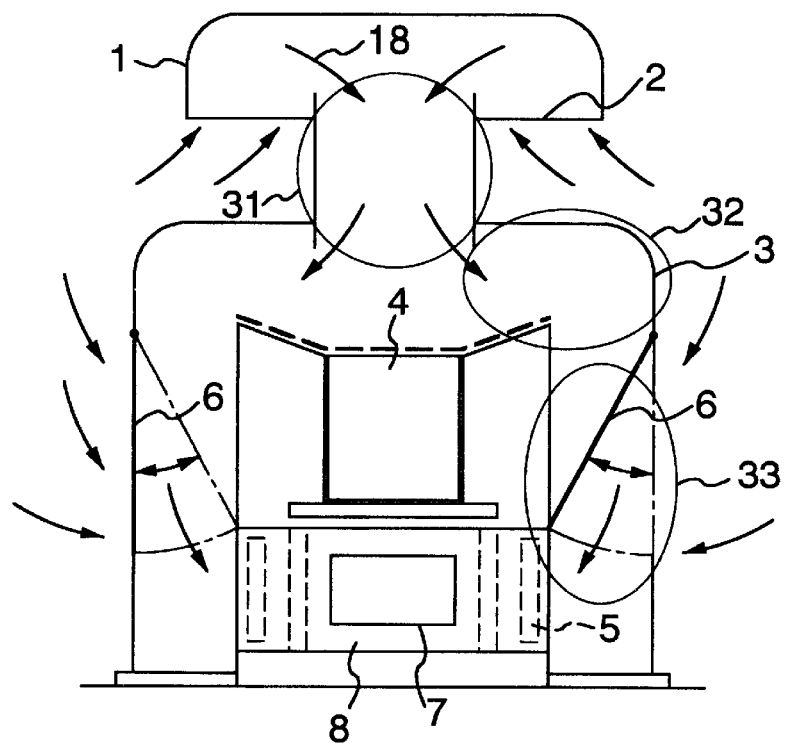
FIG. 2 is a cross-sectional view illustrating the gas turbine installation in the first embodiment of the present invention.
Figure 3:
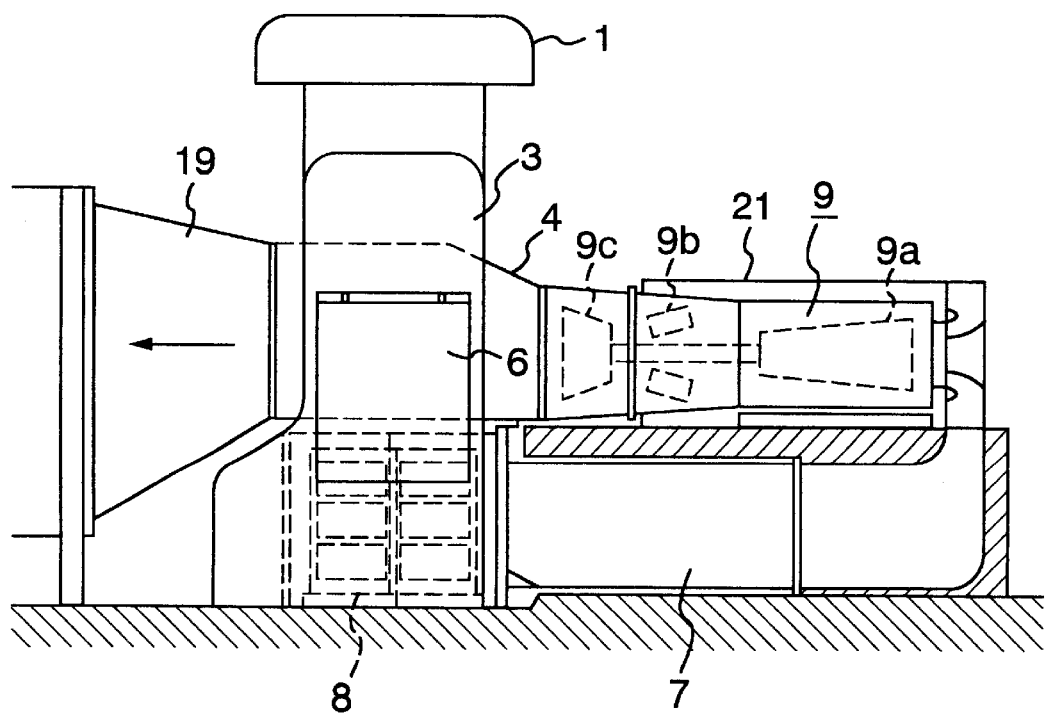
FIG. 3 is an enlarged view illustrating an essential part of the first embodiment of the present invention.

Referring to FIGS. 1 to 3 which shows an arrangement of a first embodiment of a gas turbine installation according to the present invention, among which FIG. 1 is a sectional view as a gas turbine is viewed laterally, FIG. 2 is an enlarged sectional view illustrating a gas turbine part as the gas turbine is viewed axially, and FIG. 3 is an enlarged sectional view illustrating the gas turbine part as the gas turbine is viewed laterally, there are shown a snow break hood 1 for restraining entrance of snow, a fresh air intake port 2 which is opened downward in a substantially vertical direction (gravitational direction), a second intake-air duct 3 through which intake-air 18 to a gas turbine 9 flows, an exhaust duct 4 through which exhaust gas 19 from the gas turbine flows, an intake-air filter 5 for removing dust from the intake-air to the gas turbine, dampers 6 which swing at their one end around a fulcrum so as to be opened and closed, a first intake-air duct 7 through which the intake-air to the gas turbine flows, an intake-air filter chamber 8 in which the intake-filter 5 is mounted, a gas turbine 9, a generator 11 adapted to be driven by the gas turbine 9, for generating electric power, a turbine building 12 in which the gas turbine 9 and the generator 11 are installed, a funnel 13 for emitting exhaust from the gas turbine 9, a T/G frame 20 for supporting the gas turbine and the generator 11, and a compartment 21 in which the gas turbine is housed.

The gas turbine 9 incorporates a compressor 9a for compressing mainly the intake-air 18, a combustion chamber 9b for burning a mixture of compressed air from the compressor and fuel so as to produce combustion gas, a turbine 9c driven by the combustion gas from the combustion chamber, the turbine and the compressor being coupled together by one and the same shaft (which will be denoted as "turbine/rotor"). Further, the turbine rotor is coupled at its one end with the generator 11 while the gas turbine and the generator 11 are mounted on the T/G frame 20. Further, the exhaust duct 4 is communicated with the other end of the gas turbine 9, and further, the funnel 13 is communicated with the exhaust duct 4. It is noted that a waste heat utilizing facility (for example, a waste heat recovery boiler for generating steam, a regenerator for heating air compressed by the compressor or a feed water heater for heating feed water) may be arranged in the intermediate part of the exhaust duct 4. Further, the gas turbine 9 and the generator 11 are laid in the turbine building 12 together with other components (for example, a steam turbine, a water feed pump and a control device).

In the downward intake-air type gas turbine facility, the first intake-duct 7 is integrally incorporated with the T/G frame 20 below the gas turbine 9. Further, the intake-air filter chamber 8 is provided below the exhaust duct 4, outside of the turbine building 12, being communicated with the first intake-air duct 7. The intake-air filter chamber 8 preferably has three intake ports formed respectively in side surfaces excepting a side surface on the first intake-air duct 7 side, and each provided with the intake-filter 5. It is noted that the intake-air chamber 8 may be formed at its top and bottom surfaces with intake ports, respectively. The second intake-air duct 3 is laid so as to be communicated with the suction side of the intake-air filter 5, crosses the exhaust duct 4 while covers the exhaust duct 4. The snowbreak hood 1 which is opened in a vertically downward direction (the gravitational direction), that is, having the fresh air intake port 2 is arranged at the intake port of the second intake-air duct 3. The second intake-air duct 3 and the exhaust duct 4 are preferably provided, outside of the turbine building 12. The intake-air filter chamber 8 may be arranged either in the turbine building 12 or on the outside of thereof.

Further, air sucked into the second intake-air duct 3 from the fresh air intake port 2 through the snowbreak hood 1, flows through the second intake-air duct 3 into the intake-air filter 5 where dust is removed therefrom. The intake-air 18 from which dust is removed, flows in the first intake-air duct 7, and is then sucked into the gas turbine 9 under suction. In the gas turbine 9, the sucked intake-air 18 is led into the combustion chamber 9b after it is compressed up to a given pressure (for example, 15 atm.) by the compressor 9a. In the combustion chamber 9b, the compressed air is mixed with fuel (such as natural fuel gas) into a mixture which is then burnt so as to produce combustion gas which expands (into, for example, to the atmospheric pressure) in the turbine 9c so as to rotate the turbine 9c. Thus, the generator 11 coupled to the turbine rotor is driven so as to generate electric power. The combustion gas having driven the turbine 9c and having a temperature of, for example, about 500 to 600 deg.C. is exhausted from the gas turbine 9c as the exhaust gas 19 which flows through the exhaust duct 4 and is discharged from the funnel 13.

Detailed explanation will be hereinbelow made of the second intake-air duct 3.

The second intake-air duct 3 is composed of a first passage 31 formed in a substantially vertical direction (gravitational direction), a second passage 32 formed in a substantially horizontal direction (orthogonal to the gravitational direction), and third passage 33 formed in a substantially vertical direction (gravitational direction). Further, the snowbreak hood 1 is set at the top end of the first flow passage 31. The lower end part of the first passage 31 is communicated with the intermediate part of the second passage 32. Both end parts of the second passage 32 are communicated with the top end parts of the third passages 33. The lower end parts of the third passages 33 are communicated with the intake-air filters 5. Further, the first passage 31 is arranged above the exhaust duct 4. The second passage 32 is arranged so that a bottom wall surface of the second passage 32 located in the communication part between the first passage 31 and the second passages 32 makes contact with the upper wall surface of the exhaust duct 4, and the second passage 32 three-dimensionally crosses (a torsionally relating position) the longitudinal direction (the flowing direction of the exhaust gas 19) of the exhaust duct 4. It is noted that a part of the exhaust duct 4 where the exhaust duct 4 makes contact with the second intake-air duct 3, is preferably uncovered with an insulation material which has conventionally covered the outer wall surface of the exhaust duct 4. Further, the bottom wall surface of the second passage 32 located in the communication part between the first and second passages 31, 32 and the upper wall surface of the exhaust duct 4 may be commonly used. Further, the third passages 33 three-dimensionally cross the exhaust duct 4, and are laid laterally of the exhaust duct 4. A drain port is formed in the bottom wall part of the second passage 32 in the communication part between the first passage 31 and the second passage 32.

Further, the intake-air 18 sucked through the snowbreak hood 1 flows down in the substantially vertical direction (gravitational direction) in the first passage 31, and diverges into two directions in the communication part between the first and second passages 31, 32, and flows in the second passage 32 in a substantially horizontal direction. Thereafter, the intake-air 18 flows down in the third passages 33 in a substantially vertical direction (gravitational direction), and is then sucked into the intake-air filters 5. That is, in the communication part between the first and second passages 31, 32, a T-like flow passage is defined along the flowing direction of the intake-air 18. The bottom wall surface of the second passage 32 in the communication part between the first and second passages 31, 32, is opposed to the direction in which the intake-air 18 flows in the first passage 31. Further, a part or all of snow contained in intake-air 18 is heaped on or stuck to the bottom wall surface of the second passage 32. That is, when the intake air changes its flowing direction while it impinges upon the bottom wall surface of the second passage 32 opposing the flowing direction thereof, stagnation or staying occurs in the flow of the intake air 18 in the vicinity of the bottom wall surface of the second passage 32. In particular, its diverges into two directions while it impinges upon the bottom wall surface of the second passage 32, and accordingly, it is likely to occurs the stagnation or staying in the flow of the intake-air 18 in the vicinity of the bottom wall surface of the second passage 32. Further, under the effects of the stagnation or the staying of the flow of the intake-air 18, and a difference in specific weight between the air and the snow, the snow is heaped up on or stuck to the bottom wall surface of the second passage 32. Accordingly, since the snow is heaped up in or stuck to the second intake-air duct 3, the volume of snow reaching the intake-air filters 5 is reduced, thereby it is possible to exhibit such an advantage that the intake-filters can be prevented from clogging. Further, by changing the direction of the flow of the intake-air so as to cause stagnation or staying of the flow of the intake-air, the number of wall surfaces along which the intake-air 18 flows can be reduced in comparison with such an arrangement that heat transfer pipes or the like are arranged in the passage of the intake-air duct, and accordingly, there can be exhibited such an effect that the pressure loss of the intake-air 18 can be restrained. Further, with the provision of the snowbreak hood 1 at the intake port of the second intake-air duct 3, there is also exhibited such an effect that the volume of snow sucked into the second intake-air duct 3 can be reduced.

Further, preferably, the bottom wall surface of the second passage 32 in the communication part between the first passage 31 and the second passage 32 is depressed downward so that the cross-sectional area of the second passage 32 (which is the sum of cross-sectional areas of two passages if the second passage 32 diverges into two directions as in the first embodiment of the present invention) is larger than that of the first passage 31. Accordingly, in the communication part between the first passage 31 and the second passage 32, the flowing velocity of the intake-air is lowered, and accordingly, snow can be easily separated from the flow of the intake-air 18, and accordingly it is possible to exhibit such an advantage that the heap-up or sticking of the snow on the bottom wall surface of the second passage 32 can be promoted.

With the provision of such arrangement that the bottom wall surface of the second passage 32 in the communication part between the first passage 31 and the second passage 32 makes contact with the top wall surface of the exhaust duct 4, snow or ice which has been heaped up in or stuck to the second passage 32 in the communication part between the first passage 31 and the second passage 32 or to be heaped up in or stuck to the second passage 32 can be melted by heat from the exhaust gas 19. Further, water obtained by melting snow or ice is discharged outside of the second intake-air duct 3 from the drain port formed in the bottom wall surface of the second passage 32. Accordingly, it is possible to exhibit such an advantage that the flow rate of the intake-air can be prevented from being decreased due to such a fact that the passage cross-sectional area of second intake-air duct is reduced by the heap-up of snow. Further, it is possible to exhibit such an advantage that the heat value required to melt the snow is small in comparison with such an arrangement that the temperature of the intake-air is directly increased so as to melt snow heaped up or stuck, and also exhibit such an advantage that the efficiency of the power generation and the power generation of the gas turbine 9 can be restrained from lowering since the temperature of the intake-air does not increase substantially.

For example, when it is considered that the specific heat capacity of the snow is 0.5 kcal/kg.° C., and the specific weight of snow is 0.5 g/cm$^3$, and the latent heat of fusion of snow is 80 kcal/kg, and the temperature of snow is −5 deg., the heat required for melting the snow is about 420 kcal. Meanwhile, when it is considered that the flow rate of intake-air in the gas turbine is 500 kg/s, and the specific heat capacity of air is 0.24 kcal/kg. °C., the heat value required for raising the temperature of intake-air in the gas turbine by one deg.C. is about 432,000 kcal/h (500 kW). Further, the temperature of intake-air in the gas turbine has to be set in a range from about 10 to 20 deg.C. in order to melt snow contained in intake-air in the gas turbine in a short time. Thus, it is clear that the heat value for melting snow in the arrangement according to the present invention is extremely small, in comparison with the heat value for melting snow in a conventional arrangement in which the temperature of intake-air in the gas turbine itself is raised. In other words, it is clear that the heat value for melting snow, according to the present invention does not cause substantially the temperature of intake-air in the gas turbine to rise up. It is noted that the exhaust gas 19 discharged from a waste heat recovery facility, steam or air produced from a waste heat recovery facility, steam discharged or extracted from a steam turbine or the like, air compressed by a compressor may be used as a heat source for melting snow.

The dampers 6 adapted to swing about at their one end as a fulcrum so as to be opened and closed are provided at the wall surfaces of the flow passages of the second intake-air duct 3, on the sides which are neat the intake-air filter 5 than the part making contact with the exhaust duct 4. That is, the wall surfaces of the third passages in part has a damper structure. Further, the dampers 6 are preferably controlled so as to be opened and closed in accordance with at least one of a temperature of the ambient air, a weather condition and an amount of snowfall. For example, in the case of no snowfall, the dampers 6 are fully opened. In the case of less amount of snowfall, the dampers 6 are fully or intermediately opened. In the case of a large amount of snowfall which would cause the intake-air filter 5 to clog, the dampers 6 are fully closed. It is noted that there may be used, instead of the dampers 6, an arrangement in which a third intake-air duct communicated at its one end with the ambient air is communicated at its the other end with the passage of the second intake-air duct 3 in a part which is nearer the intake-air filter 5 than the wall surface making contact with the exhaust duct 4, and further, a flow rate adjusting means (such as vanes) for adjusting the flow rate of intake-air is provided in the vicinity of a fresh air intake port of the third intake-air duct.

Further, if the fresh air intake port 2 is arranged, being higher than the expected maximum snowfall level in a district where the gas turbine installation is built, it is possible to prevent the fresh air intake port 2 from being blocked by snowfall.

As mentioned above, in a gas turbine installation to be built in a district in which snowfall is expected, a predetermined volume of intake-air can be continuously ensured for a gas turbine without hindering the efficiency of the gas turbine, irrespective of the characteristic of the intake-filter, thereby it is possible to aim at enhancing the operational reliability of the gas turbine installation. That is, although the generating efficiency of electric power and the output of electric power generation are, in general, lowered as the temperature of intake-air in a gas turbine rises up, it is possible, according to the present invention, to restrain the temperature of intake-air from extremely rising up since snow falls in the second intake-air duct in the arrangement according to the present invention, and only the wall surface of the second intake-air duct onto which snow falls, is heated by using the heat of exhaust gas from the gas turbine, thereby it is possible to restrain the temperature of intake-air in the gas turbine from rising up.

It is noted that the technical concept of the present invention may be applied not only to a downward intake-air type gas turbine installation but also to an upward intake-air type gas turbine installation and a lateral intake-air type gas turbine installation, exhibiting similar technical effects and advantages.

Further, the technical concept of the present invention can be applied to a gas turbine installation having no intake-air filter 5. In the case of no intake-air filter 5, the atmospheric air is directly taken into the gas turbine 9, and if snow is contained in the intake-air 18, it sticks to blades on the low pressure side (intake side) of a compressor of the gas turbine 9 in the form of snow itself or water drops, and accordingly, brittle fracture, erosion and damage of the blades occur. According to the first embodiment of the present invention, the volume of snow taken into the gas turbine 9 is reduced so as to prevent the blades of the compressor of the gas turbine 9 from being damaged by snow or water drops.

Next, explanation will be made of other embodiments of the present invention.

Figure 4:
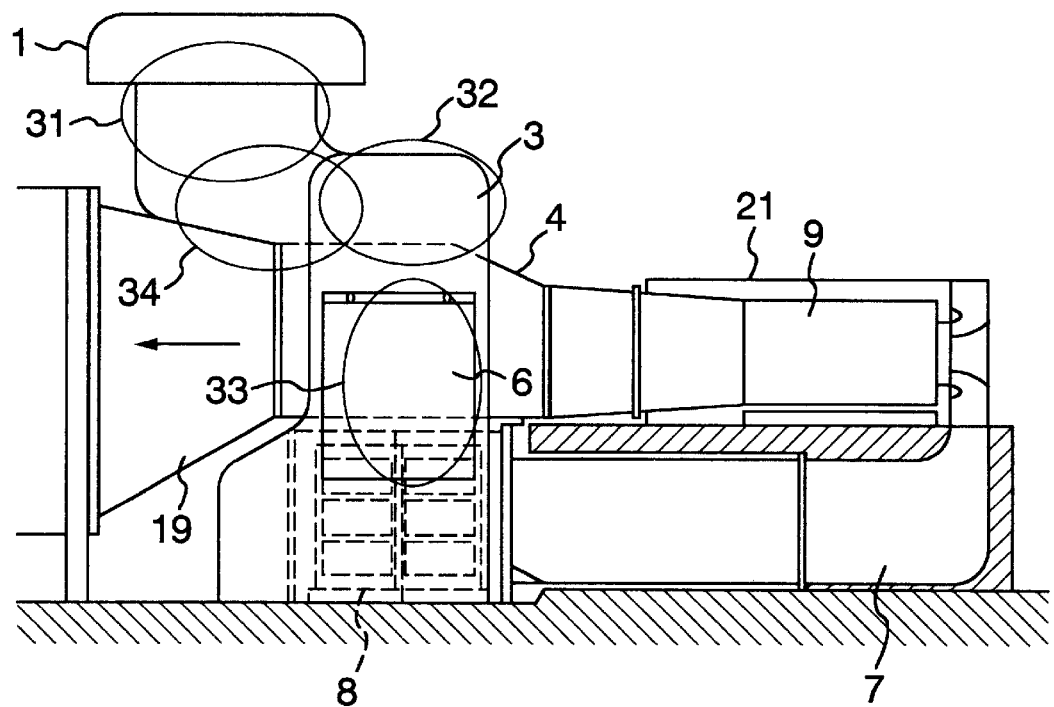
FIG. 4 is a side view illustrating a gas turbine installation in a second embodiment of the present invention.

Referring to FIG. 4 which is an enlarged sectional view illustrating a gas turbine part in a gas turbine installation in a second embodiment of the present invention as viewed from one side of the gas turbine.

In the second embodiment, the lower end part of the first passage 31 of the second intake-air duct 3 is communicated with the intermediate part of the second passage 32 as viewed in the first embodiment, through the intermediary of a fourth passage 34 formed in a substantially longitudinal direction (along the longitudinal direction of the upper wall surface of the exhaust duct 4). In this arrangement, the whole or a part of the bottom wall surface of the fourth passage 34 is made into contact with the top wall surface of the exhaust duct 4.

Further, the intake-air 18 taken into the second intake duct 3 from the snowbreak hood 1 flows in a substantially horizontal direction (along the longitudinal direction of the top wall surface of the exhaust duct 4) in the fourth passage 34 after it flows in a substantially vertical direction within the first passage 31, diverges into two directions in the communication part between the fourth flow passage 34 and the second flow passage 32, and flows in a substantially horizontal direction in the second passage 32. Thereafter, the intake-air 18 flows in a substantially vertical direction (gravitational direction) in the third passages 33, and is sucked into the intake-air filters 5. That is, an inverted T-like passage is formed in the communicated passage between the fourth passage 34 and the second passage 32 along the flowing direction of the intake-air 18. Further, the side wall surface of the second passage 32 in the communication part between the fourth passage 34 and the second passage 32 is opposed to the flowing direction of the intake-air 18 flowing the fourth passage 34. Further, the whole or a part of snow contained in the intake-air 18 is heaped up on or suck to the bottom wall surface of the fourth passage 34 due to a difference in specific weight between air and snow. Further, the remainder of the snow still contained in the intake-air 18 is heaped up on or stuck to the bottom wall surface and side wall surfaces of the second passage 32 when the flow of the intake-air 18 changes its flowing direction from the direction along the top wall surface of the exhaust duct 4 into a direction orthogonal to the direction along the top wall surface of the exhaust duct 4 in the communication part between the fourth passage 34 and the second passage 32. That is, the snow can be heaped up or stuck to the bottom wall surface and side wall surfaces of the second passage 32 under the effects of stagnation or staying of the flow of the intake-air 18 and a difference in specific weight between the air and the snow. Further, preferably, the cross-sectional area of the fourth passage 34 is set to be larger than that of first passage 31, and the cross-sectional area of the second passage 32 is set to be larger than that of the fourth passage 34.

According to the second embodiment of the present invention, in addition to the technical effects and advantages obtained in the first embodiment as mentioned above, there is exhibited such technical effects and advantages that the volume of snow separated from the intake-air 18 is increased since the length of the passage (fourth passage 34) extending in a substantially horizontal direction is increased in the second intake-air duct 3, and accordingly, the volume of snow reaching the intake-air filters 5 can be decreased, thereby it is possible to prevent the intake-air filters 5 from clogging.

If the length of the passage in a substantially horizontal direction is sufficiently long, and if the flowing velocity of the intake-air 18 is sufficiently low, snow is separated from the intake-air 18 due to the a difference in specific weight between air and snow, and is heaped up in the second intake-air duct 3. For example, if it is considered that the natural falling speed of snow is 1 m/s, the flowing velocity of the intake-air 18 is set to 2.5 m/s, and the height of the passage is 3 m, the horizontal length required for reaching of the snow to the bottom wall surface of the passage becomes about 7.5 m.

Figure 5:
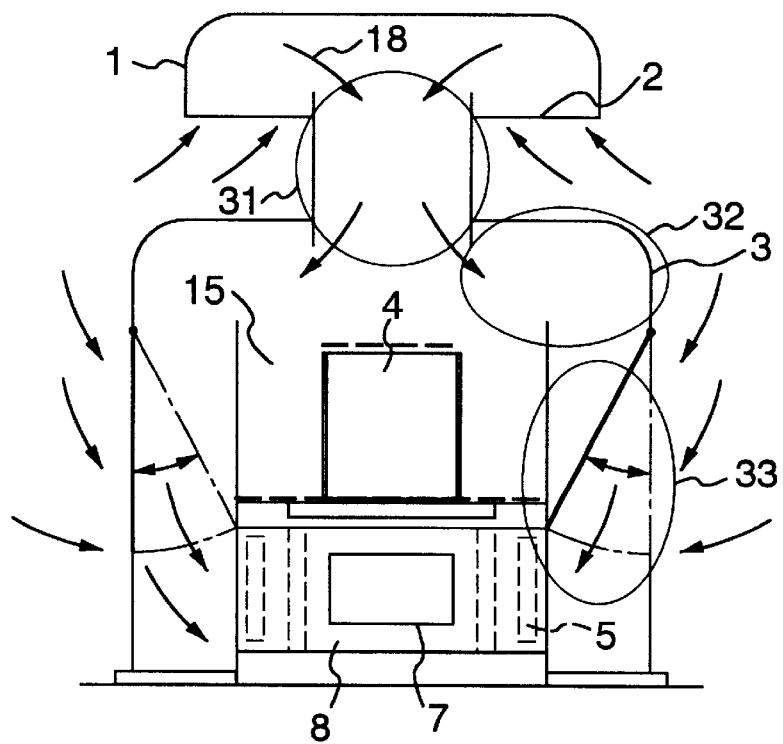
FIG. 5 is a cross-sectional view illustrating a gas turbine installation in a third embodiment of the present invention.

Next, explanation will be made of a third embodiment of the present invention with reference to FIG. 5 which is an enlarged sectional view illustrating a gas turbine part in a gas turbine installation as viewed axially of the gas turbine in the third embodiment of the present invention.

In the third embodiment, the bottom part of the second passage 32 of the second intake-air duct 3 is depressed downward so as to define a space 15 which covers the exhaust duct 4. That is, the space 15 is so arranged that a part of wall surfaces defining the space 15 makes contact with side wall surfaces of the exhaust duct 4.

Further, the intake-air sucked into the second intake-air duct 3 from the snowbreak hood 1 flows in the first passage 31 in a substantially vertical direction (gravitational direction), and diverges into two directions in the communication part between the first passage 31 and the second passage 32, flowing in the second passage 32 in a substantially horizontal direction, and thereafter, flows in the third passages 33 in a substantially vertical direction before it is sucked into the intake-air filters 5. Since the passage for the intake-air 18 is enlarged by the space 15 below the second flow passage 32 in the communication part between the first passage 31 and the second passage 32, just after the flow of the intake-air 18 changes its direction from the substantially vertical direction (gravitational direction) into the substantially horizontal direction, the flowing velocity of the intake-air 18 whose flow is turbulent is lowered, and accordingly, the whole or a part of snow contained in the intake-air 18 is heaped up on or stuck to the bottom surface of the space 15 due to a difference in specific weight between the air and the snow.

According to the third embodiment, in addition to the technical effects and advantages in the above-mentioned first embodiment, since the flowing velocity of the intake-air 18 whose flow is turbulent is lowered, there are exhibited such technical effects and advantages that the volume of snow separated from the flow of the intake-air 18 is increased so that the quantity of snow removed by the second intake duct 3 is increased while the volume of snow reaching the intake-air filters 5 is decreased, thereby it is possible to prevent the intake-air filter 5 from clogging. Further, the passage of the intake-air 18 is increased just after the flow of the intake-air 18 changes its direction, there are exhibited such technical effects and advantages that the flow of the intake-air 18 is less turbulent in its entirety, and pressure loss in the intake-air 18 is slight.

Further, a damper may be arranged at the upper part of the space 15 so that the opening degree of the damper is controlled in accordance with a volume of snow contained in the intake-air 18 (when the damper is fully closed, the passage of the intake-air becomes identical with that of the first embodiment). For example, the volume of snow contained in the intake-air 18 is less, the opening degree of the damper is set to be small.

Figure 6:
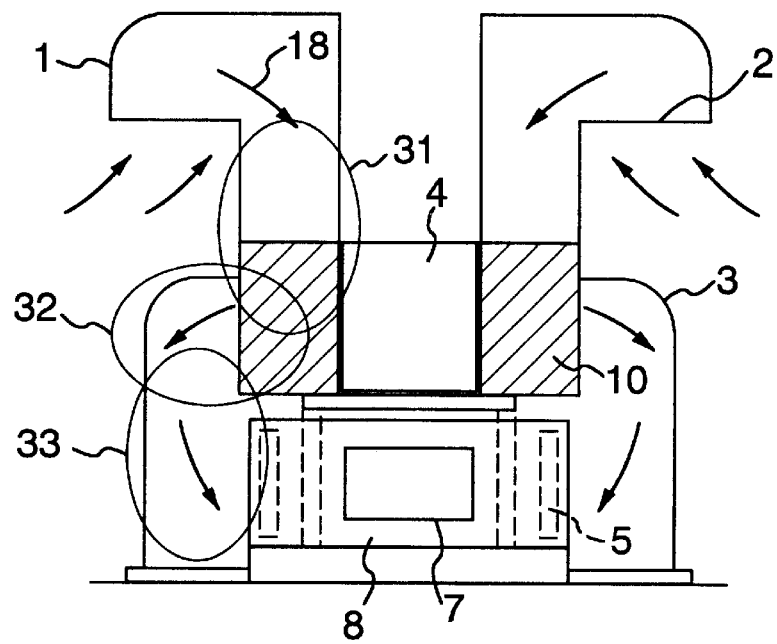
FIG. 6 is a cross-sectional view illustrating a gas turbine installation in a fourth embodiment of the present invention.

Next, explanation will be made of a gas turbine installation in a fourth embodiment of the present invention with reference to FIG. 6 which is an enlarged sectional view illustrating a gas turbine part in the gas turbine installation, as viewed axially of a gas turbine.

The second intake-air duct 3 is composed of a first passage 31 extending in a substantially vertical direction (gravitational direction), a second passage 32 formed in a substantially horizontal direction (substantially orthogonal to the gravitational direction, and third passages 33 formed in a substantially vertical direction (gravitational direction). Further, the snowbreak hood 1 is arranged at the top end of the first passage 31. The second passage 32 is communicated at its one end to the bottom end part of the first passage 31, and is communicated at its the other end part to the top end parts of the third passages 33. The bottom end part of the third passage 33 is communicated with the intake-air filters 5. That is, crank-like passages are defined in the combination of the first, second and third passages 31, 32, 33. Further, a part of the side wall surfaces of the first passage 31 and/or the second passage 32 is made into contact with the side wall surfaces of the exhaust duct 4. Heat transfer members 10 which are excellent in heat-transmission and which are made of a material preferably containing a metallic element having a high heat transfer coefficient, such as gold, silver, copper, aluminum, tungsten or zinc is provided at the wall surface part of the second intake-air duct 3, which makes contact with the side wall surfaces of the exhaust duct 4.

Further, the intake-air 18 sucked into the second intake-air duct 3 from the snowbreak hood 1 flows through the first passage 31 in a substantially vertical direction (gravitational direction), then flowing through the second passage 32 in a substantially horizontal direction, and flows in the third passages 33 in a substantially vertical direction (gravitational direction) before it is sucked into the intake-air filters 5. Thus, the whole or a part of snow contained in the intake-air 18 is heaped up on the bottom wall surface of the second passage 32 when the flow of the intake-air passage 18 changes its direction from the substantially vertical direction (gravitational direction) into the substantially horizontal direction in the communication part between the first passage 31 and the second passage 32. That is, the snow can be heaped up on the bottom wall surface of the second passage 32 under the effects of stagnation or staying of the flow of the intake air in the vicinity the bottom wall surface of the second passage 32 and a difference in specific weight between snow and air.

This fourth embodiment can exhibit technical effects and advantages similar to those obtained in the first embodiment.

Figure 7:
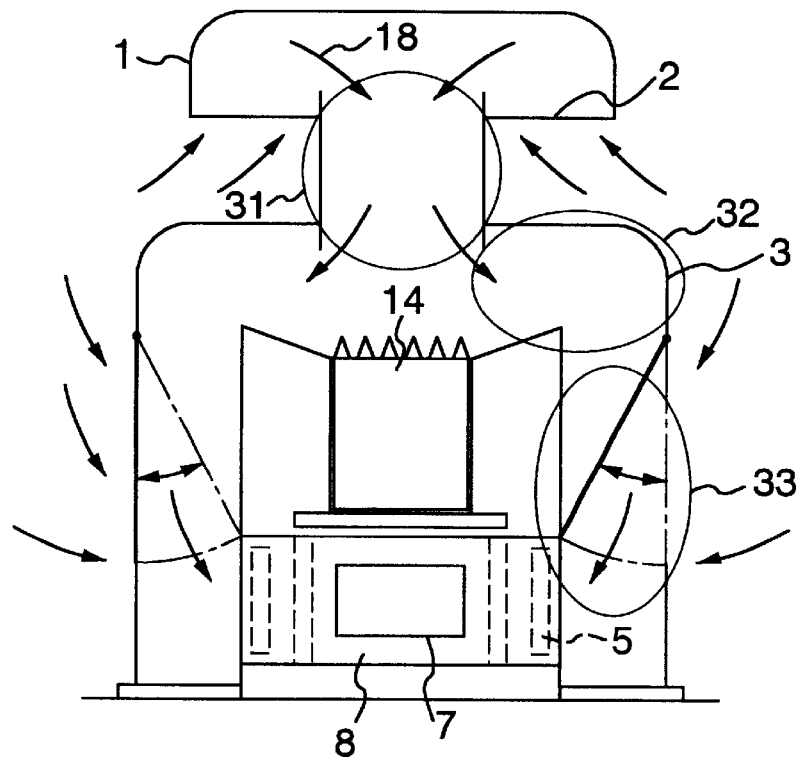
FIG. 7 is a cross-sectional view illustrating a gas turbine installation in a fifth embodiment of the present invention.

Next, explanation will be made of a fifth embodiment of the present invention with reference to FIG. 7 which is an enlarge sectional view illustrating a turbine part of a gas turbine installation in the fifth embodiment of the present invention, as viewed axially of a gas turbine.

In the fifth embodiment, stagnating members or staying members 14 which are protrusions for stagnating or staying the flow of the intake-air 18 are arranged on the bottom wall surface of the second passage 32 in the communication part between the first passage 31 and the second passage 32 in the second intake-air duct 3 as explained in the first embodiment. With the provision of these stagnating member (or staying members) 14, stagnation or staying of the flow of the intake-air is promoted in the vicinity of the bottom wall surface of the second passage 32. Accordingly, snow is likely to stack on or stick to the bottom wall surface of the second passage 32.

According to the fifth embodiment, in addition to the technical effects and advantages obtained in the first embodiment, there are exhibited such technical effects and advantages that the stagnation or staying of the flow of the intake-air 18 can be promoted in the vicinity of the bottom wall surface of the second passage 32 by the stagnating members (or staying members) 14 so that the volume of snow removed by the second intake-air duct 3 is increased, and accordingly, the quantity of snow reaching the intake-air filter 5 is further reduced, thereby it is possible to prevent the intake-air filters from clogging.

Further, in such a case that the bottom wall surface of the second passage 32 makes contact with the top wall surface of the exhaust duct 4 in the communication part between the first passage 31 and the second passage 32, the stagnating members (or staying members) 14 arranged on the contact part of the second passage increase the area of the wall surface which is heated by the exhaust gas 19 and with which the intake-air 18 (snow) makes contact, so as to promote the heat transmission from the wall surface to the intake-air 18 (snow), and accordingly, there is exhibited such an advantages that the melting of snow can be promoted. The stagnating members (or staying members) may be made of the same material as that of the second intake-air duct 3, but, in such a case that the stagnating members (or staying members) 14 are incorporated with a heat-transmission promoting function, it is preferably made of a material which contains a metallic element which is excellent in heat-transmission, such as gold, silver, copper, aluminum, tungsten or zinc.

Explanation will be made of an embodiment in which the technical concept of the present invention is applied in a gas turbine installation incorporating an intake-air duct and an intake-air filter chamber on one side of the exhaust duct.

Figure 8:
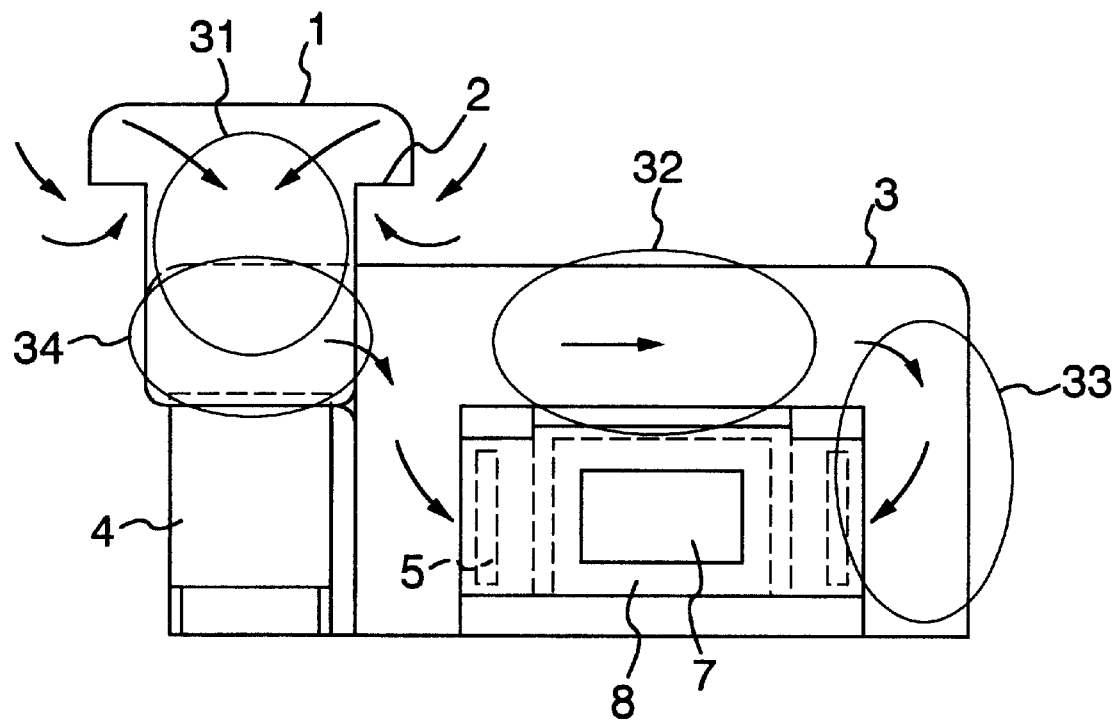
FIG. 8 is a side view illustrating a gas turbine installation in a sixth embodiment of the present invention.

Referring to FIG. 8 which is an enlarged sectional view illustrating a gas turbine part as viewed axially of a gas turbine in a gas turbine installation in a sixth embodiment of the present invention, the second intake-air duct 3 is composed of a first flow passage 31 formed in a substantially vertical direction (horizontal direction), a second passage 32 formed in a substantially horizontal direction (orthogonal to the gravitational direction), third passages 33 formed in a substantially vertical direction (gravitational direction) and a fourth passage formed in a substantially horizontal direction (orthogonal to the gravitational direction). A snow break hood 1 is arranged at the top part of the first passage 31. The fourth passage 34 is communicated at its one with the bottom end part of the first passage 31, and is communicated at its the other end with one end part of the second passage 32. The second passage 32 is communicated in its intermediate part and at its the other end with the top end part of the third passage 33, respectively. The intake-air filters 5 are communicated with the bottom end parts of the third passages 33. Further, the first passage 31 is located above the exhaust duct 4. The fourth duct 34 is formed so that it extends in a substantially horizontal direction (along the longitudinal direction of the top wall surface of the exhaust duct 4), and that its bottom wall surface makes contact with the top wall surface of the exhaust duct 4. Further, the second passage 32 is located above the intake-air filter chamber 6, and is extended in a direction orthogonal to a direction in which the fourth passage 34 is formed.

The intake-air 18 sucked into the second intake-air duct 3 through the snowbreak hood 1 flows in the first passage 31 in a substantially vertical direction (gravitational direction), and then flows in the fourth passage 34 in a substantially horizontal direction (along the longitudinal direction of the top wall surface of the exhaust duct 4). In the communication part between the fourth passage 34 and the second passage 32, the flow of the intake-air changes its flowing direction into a direction orthogonal to the present flowing direction, and then, the intake-air 18 flows in the second passage 32 in a substantially horizontal direction. Thereafter, the intake-air 18 flows down in the third passages 33 in a substantially vertical direction (gravitational direction), and is then sucked into the intake-air filters 5. Further, the whole or a part of snow contained in the intake-air 18 is heaped up on or stuck to the bottom wall surface of the fourth flow passage 34 due to a difference in specific weight between snow and air. The remainder of the snow still contained in the intake-air 18 is heaped up on or stuck to the bottom wall surface and the side surface of the second passage 32 when the flow of the intake-air 18 changes its direction from a direction toward the top wall surface of the exhaust duct 4 into a direction orthogonal to the direction along the top wall surface of the exhaust duct 4 in the communication part between the fourth passage 34 and the second passage 32. That is, under the effects of the stagnation or staying of the flow of the intake-air 18 in the vicinity of the side wall surfaces of the second passage 32 and the difference in specific weight between air and snow, the snow can be heaped up on or stuck to the bottom wall surface and side wall surfaces of the second passage 32.

According to the sixth embodiment of the present invention, there are exhibited technical effects and advantages similar to those obtained in the second embodiment.

Next, explanation will be made of the typical shape of the passage of the second intake-air duct in which snow contained in the intake-air 18 is heaped up or stuck.

FIGS. 9 to 12 are sectional views illustrating various second intake-air ducts in the gas turbine power plant installation according to the present invention (as viewed laterally of the gas turbine). It is noted that intake-filters 5 can be eliminated, that is, the second intake-air duct 3 may be directly communicated with the gas turbine 9.

Figure 9:
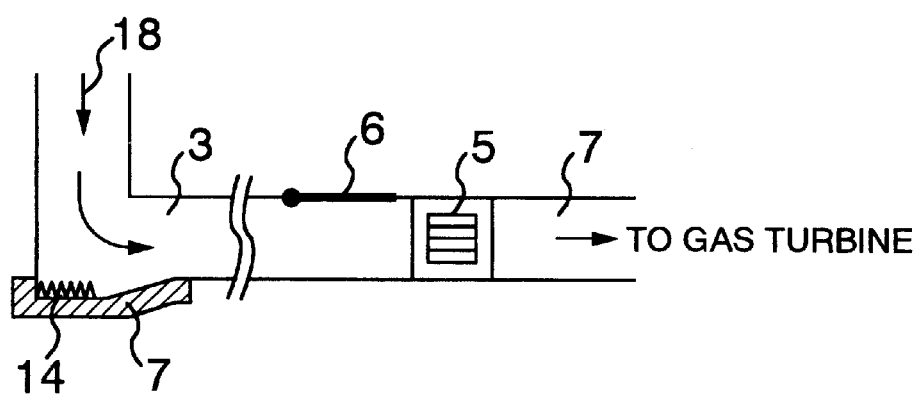
FIG. 9 is a sectional view illustrating a second intake-air duct in a gas turbine installation according to the present invention.

The passage in the second intake-air duct 9 shown in FIG. 9, has an L-like shape in a part thereof. Further, the intake-air 18 flows in a substantially vertical direction (gravitational direction), and then changes its direction into a direction substantially orthogonal to the present flowing direction, that is, in a substantially horizontal direction.

When the direction of the intake-air 18 is changed, stagnation or staying occurs. Accordingly, the whole or a part of snow contained in the intake-air 18 is heaped up on the bottom wall surface of the passage thereof. Further, preferably, a part where the snow is heaped up, that is, the bottom wall surface 17 of the passage which changes the direction of the flow of the intake-air 18 is preferably held at a temperature above the melting point of snow (for example, 10 to 20 deg.C.), or is heated to a temperature above the melting point of snow. Further, in a part where the snow is heaped up or stuck, that is, the bottom surface part 17 of the passage where the direction of the intake-air 18 is changed, the stagnating members (or staying members) 14 are preferably arranged. Further, preferably, the stagnating members (staying members) 14 are in the form of protrusions or corrugation for promoting the heat-transmission of the bottom wall surface 18 held at or heated to a predetermined temperature.

Figure 10:
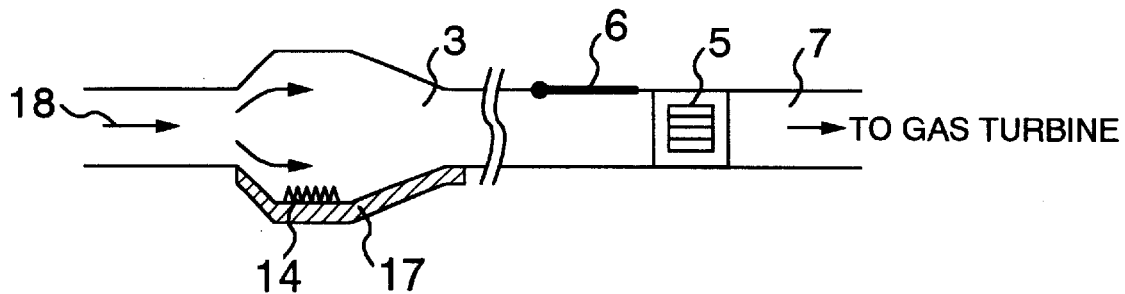
FIG. 10 is a sectional view illustrating a second intake-air duct in a gas turbine installation according to the present invention.

The passage of the second intake-air duct 3 shown in FIG. 10, is partly enlarged, that is, the cross-sectional area of a part of the passage is greater than that of the other part thereof. Further, the flowing velocity of the intake-air 18 is lowered in the part where the passage is enlarged, and accordingly, the snow is separated from the intake-air 18. Thus, the whole or a part of the snow is heaped up on or stuck to the bottom wall surface 17 of the passage. Further, preferably, the increasing rate of the cross-sectional area of the passage is increased so as to cause the intake-air 18 to peel off from the wall surface of the passage in order to stagnate or stay the flow of the intake-air 18. Further, preferably, a part where the snow is heaped up, that is, the bottom wall surface 17 is held at a temperature above the melting point of snow (for example, 10 to 20 deg.C.) or is heated up to a temperature the melting point of snow (for example, 10 to 20 deg.C.). Further, the stagnating members or the staying members are preferably arranged in a part where the snow is heaped up. Moreover, preferably, the stagnating members or the staying members are in the form of protrusions or corrugation so as to promote the heat-transmission of the bottom wall surface 17 which is held or heated up to a predetermined temperature.

Figure 11:
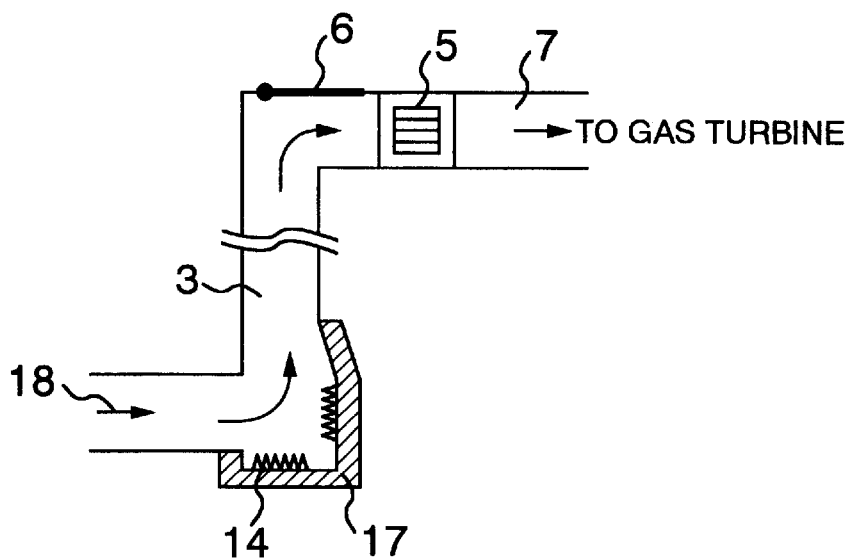
FIG. 11 is a sectional view illustrating a second intake-air duct in a gas turbine installation according to the present invention.

Referring to FIG. 11, the passage of the second intake-air duct 3 has, in part, an L-like shape. Further, the intake-air 18 changes its flowing direction into a direction orthogonal to a substantially horizontal direction in which the intake-air 18 has been flown just before, that is, the intake-air 18 flows in a substantially vertical direction. When the flowing direction of the intake-air 18 is changed, stagnation or staying occurs.

Accordingly, the whole or a part of snow contained in the intake-air 18 is heaped up on the bottom wall surface 17 of the passage. In particular, by changing the flowing direction of the intake-air 18 into a direction opposed to the direction in which the gravitation is effected, after the flowing direction of the intake-air 18 is changed, the separation of the snow from the flow of the intake-air 18 is promoted. Further, preferably, a part where the snow is heaped up, that is, the bottom wall surface 17 of the passage where the intake-air 18 changes its flowing direction, is held at a temperature higher than the melting point of snow (10 to 20 deg.C.) or is heated up to a temperature higher than the melting point of snow (10 to 20 deg.C.). Further, preferably, the stagnating members (or the staying members) 14 are arranged in the part where the snow is heaped up or stuck, that is, the bottom wall surface 17 where the flowing direction of the intake-air 18 is changed. Further, preferably, the stagnating members (or the staying members) are in the form of protrusions or corrugation in order to promote the heat-transmission of the bottom wall surface 17 which is held at or heated up to a predetermined temperature.

Figure 12:
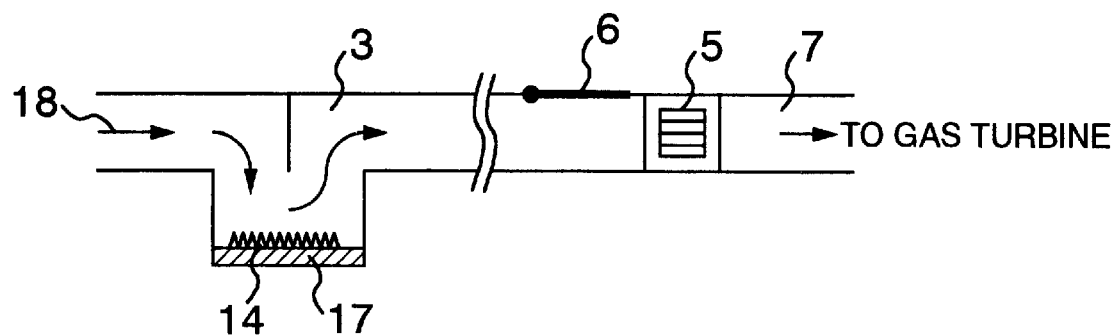
FIG. 12 is a sectional view illustrating a second intake-air duct in a gas turbine installation according to the present invention.

Referring to FIG. 12, the passage of the second intake-air duct 3 has, in part, a U-like shape. Further, the intake-air changes its flowing direction, after flowing in a substantially horizontal direction, into a substantially vertical direction, a substantially horizontal direction and a substantially vertical direction, successively, within a U-like shape part of the passage. When the flowing direction of the intake-air 18 is changed within the U-like shape part of the passage, stagnation or staying of the flow of the intake-air occurs. Accordingly, the whole or a part of snow contained in the intake-air 18 is heaped up on or suck to the side wall surface or the bottom wall surface 17 of the passage. Further, preferably, the part where the snow is heaped up, that is, the bottom wall surface 17 of the passage is held at a temperature above the melting point of snow (for example, 10 to 20 deg.C.), or is heated up to a temperature above the melting point of snow (for example, 10 to 20 deg.C.). Further, preferably, the stagnating members (or the staying members) 14 are arranged in the part where the snow is heaped up or stuck, that is, the bottom wall surface 17 where the flowing direction of the intake-air 18 is changed. Further, preferably, the stagnating members (or the staying members) are in the form of protrusions or corrugation in order to promote the heat-transmission of the bottom wall surface 17 which is held at or heated up to a predetermined temperature.

According to the present invention, since the shape of the passage of an intake-air duct communicated with the suction side of an intake-air filter is regulated so as to stagnate or stay the flow of intake-air to a gas turbine, that is, to lower the flowing velocity of the intake-air, the larger the quantity of snow contained in the flow of the intake-air to the gas turbine is separated from the flow of the intake-air to the gas turbine, and the snow is then heaped up or stuck in the intake-air duct, thereby it is possible to exhibit such technical effects and advantages that the volume of snow reaching the intake-air filter is reduced so as to prevent the intake-air filter from clogging, and to prevent the flow rate of the intake-air in the gas turbine from being lowered.

What is claimed is:

1. A gas turbine installation comprising a gas turbine, a first intake-air duct laid below said gas turbine and having an upstream side, for allowing intake-air to flow into the gas turbine therethrough, an exhaust duct laid above said first intake-air duct, for allowing exhaust gas to pass therethrough from said gas turbine, said first intake-air duct having an intake port arranged below the exhaust duct and provided therewith an intake-air filter, a second intake-air duct communicated with the upstream side of said first intake-air duct, said second intake-air duct having a second intake port formed in the upper part thereof, for introducing fresh air, a first passage extending in a substantially vertical direction from said second intake port toward said exhaust duct, a second passage having at its one end communicated with said first passage and extending in a substantially horizontal direction from the communication part between said first passage and said second passage, and a third passage having one end communicated with said second passage, extending in a substantially vertical direction from the communication part between said third passage and said second passage, and communicated with the suction side of said intake-air filter provided to the first intake-air duct.

2. A gas turbine installation as set forth in claim 1, wherein said second intake duct is provided with a snow-break hood having a fresh air inlet port and arranged at the second intake port.

3. A gas turbine installation as set forth in claim 1, wherein a stagnating means for stagnating the flow of intake-air to said gas turbine or a staying means for staying the flow of intake-air into said gas turbine is arranged in the vicinity of the communication part between said first passage and said second passage.

4. A gas turbine installation as set forth in claim 1, wherein a melting means for melting snow or ice is provided in the vicinity of the communication part between said first passage and said second passage.

5. A gas turbine installation as set forth in claim 1, wherein a heating means for heating a wall surface of said second intake-air duct is proved in said second passage.

6. A gas turbine installation as set forth in claim 5, wherein a fresh air introducing means for introducing fresh air into said intake-air filter is provided in said third passage.

7. A gas turbine installation as set forth in claim 1, wherein the cross-sectional area of said second passage through its entirety or in its intermediate part is set to be greater than that of said first passage.

* * * * *